US006427992B1

(12) United States Patent
Noda et al.

(10) Patent No.: US 6,427,992 B1
(45) Date of Patent: Aug. 6, 2002

(54) CLAMPING CYLINDER ACTUATOR

(75) Inventors: Mitsuo Noda, Ichinomiya; Kanji Miyata, Hashima; Tsuyoshi Yonezawa, Aichi-ken, all of (JP)

(73) Assignee: Howa Machinery, Ltd., Aichi-Ken (JP)

(*) Notice: Subject to any disclaimer, the term of this patent is extended or adjusted under 35 U.S.C. 154(b) by 0 days.

(21) Appl. No.: 09/689,413

(22) Filed: Oct. 12, 2000

(30) Foreign Application Priority Data

Oct. 13, 1999 (JP) ........................................ 11-290596
Nov. 9, 1999 (JP) ........................................ 11-318368

(51) Int. Cl.[7] ................................................ B23Q 3/08
(52) U.S. Cl. ...................................................... 269/24
(58) Field of Search ............................ 269/20, 24, 32, 269/25; 254/93 H; 29/252

(56) References Cited

U.S. PATENT DOCUMENTS 5,013,015 A * 5/1991 Fatheree ...................... 269/24
5,778,511 A * 7/1998 Keaton ........................ 269/24

FOREIGN PATENT DOCUMENTS

| | | |
|---|---|---|
| JP | 60-123238 | 7/1985 |
| JP | 10-315083 | 12/1998 |

* cited by examiner

*Primary Examiner*—Robert C. Watson
(74) *Attorney, Agent, or Firm*—Ladas & Parry

(57) ABSTRACT

A clamping cylinder actuator has a front end cover (7). A back surface (9) of the front end cover (7) has a joining surface (102) joined to a fixed member (100). A thin, flat gasket (30) formed from elastic rubber materials and such is interposed between the front end cover (7) and a front end surface of a cylinder (1) facing the front end cover (7). The gasket (30) is fitted on a boss (10) formed on the front end cover (7) and extends over the entire back surface of the front end cover (7) having a sealing surface (11) surrounded by the joining surface (12). When the front end cover (7) is fastened to the fixed member (100) with bolts (101), the gasket 30 is held between the front end cover (7) and the fixed member (100). The gasket (30) prevents the loosening of the bolts (101).

20 Claims, 14 Drawing Sheets

CLAMPING CYLINDER ACTUATOR

BACKGROUND OF THE INVENTION

1. Field of the Invention

The present invention relates to a clamping cylinder actuator attached to a fixed member of a machine, such as a base to hold a workpiece fixedly on the fixed member for machining by a machine tool or the like and, more particularly, to a clamping cylinder actuator having a front end cover having a back joining surface to be joined to a fixed member of a machine, such as a base.

2. Description of the Related Art

A first related art clamping cylinder actuator disclosed in JP-B No. Sho 62-5739 (Publication 1) has a cylinder, and a front end cover having a back joining surface and a boss fitted in the bore of the cylinder with an O ring held between the cylinder and the boss of the front end cover. A second related art clamping cylinder actuator disclosed in JP-A No. 10-315083 (Publication 2) has a cylinder, a front end cover formed integrally with the cylinder, and the front end cover has a back joining surface to be joined to a fixed member of a machine, such as a base.

In the first related art clamping cylinder actuator disclosed in Publication 1, the boss of the front end cover needs a longitudinal dimension sufficient to form an annular groove to hold the O ring therein in the boss. Therefore, the length of the cylinder must include a length corresponding to a length in which the boss must be formed to form the annular groove for the O ring therein in addition to a length corresponding to the effective stroke of a piston that moves axially in the cylinder bore and hence the cylinder is inevitably long. The clamping cylinder actuator needs many bolts for fastening the front end cover and a back end cover to the cylinder, which requires troublesome part management and increases assembling work.

Although the second related art clamping cylinder actuator disclosed in Publication 2 does not have such problems, the cylinder and the front end cover cannot be formed of different materials, respectively because the cylinder and the front end cover are formed in an integral unit by forming.

Both the first and the second related art clamping cylinder actuator have the back joining surfaces to be joined to a fixed member of a machine. Since the front end cover is fastened to the fixed member with bolts with the joining surfaces thereof in direct contact with the fixed member, it is possible that the bolts are loosened by vibrations generated by the machine.

In the second related art clamping cylinder actuator disclosed in Publication 2, side ports for a working fluid are formed in a side surface of the front end cover and end ports are formed in the joining surface of the front end cover, and a pipe is connected to either the side ports formed in the side surface or the end ports formed in the joining surface. When the side ports are used and the end ports are not used, O rings are placed between the joining surface and the fixed member so as to surround the end ports to create nonleaking union between the front end cover and the fixed member. Handling the small O rings is troublesome and O rings are often lost.

A known clamping cylinder actuator has a cylinder provided on its outer surface with a position sensor for measuring the position of a piston fitted in the cylinder. Since the position sensor juts out from the outer surface of the cylinder, the clamping cylinder actuator needs a large space for installation, the cylinder needs a long machining time and hence the cylinder is costly.

A front end cover integrally provided with a guide member cannot be used as a part of another clamping cylinder actuator that does not need any guide member.

It is possible that a cutting fluid or a cutting oil leaks into the position sensor and cause the position sensor to malfunction. Therefore, although the position sensor is leakproofed, it is undesirable, in respect of durability, to use the clamping cylinder actuator in an environment where the position sensor is exposed to the cutting fluid.

Accordingly, it is an object of the present invention to provide a clamping cylinder actuator having a front end cover having a back joining surface to be joined to a fixed member, in which a seal structure is held between the front end cover and a cylindrical member to which the front end cover is joined, and the seal structure prevents the loosening of bolts fastening the front end cover to the fixed member, under vibrations. It is also an object of the present invention to provide a clamping cylinder actuator with side ports and end-ports formed in the front end cover, in which an O ring is not necessary to be used for sealing the end ports.

Another object of the present invention is to reduce the manufacturing cost of a clamping cylinder actuator provided on the outer surface of the cylinder thereof with a magnetic sensor and to improve the appearance of the same.

For a further object, the present invention provides a clamping cylinder actuator requiring a small number of fastening parts necessary for fastening together its components including a front end cover, a cylinder and a back end cover, easy to assembly and satisfactory in appearance. The present invention also provides a clamping cylinder actuator having a front end cover provided with a small number of through holes. Further, the present invention provides a clamping cylinder actuator including a front end cover, a back end cover and a cylinder which can be fastened together in an airtight fashion with bolts. Furthermore, the present invention provides a clamping cylinder actuator having a front end cover available to clamping cylinder actuators of other types and effective in reducing the number of parts, and capable of being manufactured at a low manufacturing cost.

For a still further object, the present invention provides a clamping cylinder actuator having a position sensor for measuring the position of a piston in a cylinder, and a sensor cover capable of satisfactorily covering the position sensor so that the position sensor may not be wetted with a cutting fluid or the like.

SUMMARY OF THE INVENTION

According to a first aspect of the present invention, a clamping cylinder actuator attached to a fixed member to clamp down a workpiece on the fixed member comprises: a cylindrical member; a front end cover provided with an opening and joined to the front end of the cylindrical member; a piston rod axially slidably extended through the opening of the front end cover; a back end cover disposed at the back end of the cylindrical member; and a gasket held between the cylindrical member and the front end cover to make a sealed joint between the front end of the cylindrical member and the front end cover; wherein the front end cover is attached to the fixed member with a joining surface of the back surface thereof extending outward from a sealing surface of the back surface thereof corresponding to the front end of the cylindrical member in contact with the fixed member, and the gasket covers the sealing surface and the joining surface of the back surface of the front end cover. The joining surface of the front end cover can be partly or entirely covered with the gasket.

Preferably, the cylindrical member includes a cylinder, a back end of which is joined to the back end cover, and the gasket makes a sealed joint between the front end of the cylinder and the back surface of the front end cover. When the cylindrical member includes a cylinder, and a guide member holding member disposed between the cylinder and the front end cover to hold a guide member engaged in a helical guide groove formed in the piston rod, the gasket makes a sealed joint between the front end surface of the guide member holding member and the back surface of the front end cover.

Since the gasket making a sealed joint between the front end cover and the cylindrical member extends over the joining surface, bolts fastening the front end cover to the fixed member will not be loosened by vibrations generated by a machining operation because the gasket is elastic. Since the front end cover and the cylindrical member (or the cylinder) are separate members, the cylindrical member and the front end cover can be formed of different materials, respectively, which facilitates reducing the cost. Since any O ring is not necessary to make a sealed joint between the front end cover and the cylindrical member, the front end cover may be provided with a short boss that is fitted in the cylinder bore of the cylindrical member, so that the cylindrical member can be formed in a small length.

Preferably, a side port connected to the cylinder bore of the cylindrical member is formed in a side surface of the front end cover, an end port connected to the side port is formed in the joining surface of the front end cover, and a portion of the gasket covering the joining surface serves as a sealing member for sealing the end port. When the end port is not used, the gasket makes a sealed joint between the front end cover and the fixed member. When a pipe is connected to the end port, the gasket makes a sealed joint between the pipe and the end port. Since any small sealing member, such as an O ring, is not used for sealing the end port, troubles attributable to the loss of a sealing member and work for attaching the small sealing member can be avoided.

Preferably, the clamping cylinder actuator further comprises a gasket held between the back end of the cylinder and the back end cover to make a sealed joint between the cylinder and the back end cover. The length of a boss of the back end cover to be fitted in the cylinder bore may be smaller than a length in which the boss must be formed when a sealed joint is made between the back end cover and the cylindrical member by an O ring, which is effective in forming the clamping cylinder actuator in a small length.

The present invention is applicable to a clamping cylinder actuator of a unilateral piping type comprising a cylindrical member, a piston rod, a piston connected to the piston rod and fitted in the cylinder bore of the cylindrical member, and a front end cover joined to the front end of the cylindrical member and provided with a pair of side ports respectively communicating with front and back pressure chambers on the front and the back side of the piston. A pair of end ports are formed in a joining surface of the front end cover so as to communicate with the pair of side ports, respectively, and a portion of the gasket covering the joining surface serves as a sealing member for sealing the pair of end ports.

The present invention is featured by matters set forth in claims 8 to 20.

Since the front end cover and the cylindrical member (cylinder, etc.) are separate members, the cylindrical member and the front end cover can be formed of different materials, respectively, which facilitates reducing the cost of the clamping cylinder actuator. Since any O ring is not necessary to make a sealed joint between the front end cover and the member to which the front end cover is joined, the front end cover may be provided with a short boss that is fitted in the cylinder bore of the cylindrical member. Since the gasket held between the front end cover and the member to which the front end cover is joined extends over both the sealing surface and the joining surface of the back surface of the front end cover, bolts fastening the front end cover to the fixed member will not be loosened by vibrations generated by a machining operation because the gasket is elastic.

Since the gasket is held between the joining surface and the fixed member, the cutting fluid wetting the front end cover is unable to flow over the outer surface of the cylinder. Since the portion of the gasket extending over the joining surface serves also as a sealing member for sealing the end ports, a sealed joint is made between the end ports and the fixed member when the end ports are not used. When pipes are connected to the end ports, the gasket makes a sealed joint between the pipes and the end ports. Since any small sealing member, such as an O ring, is not used for sealing the end ports, troubles attributable to the loss of a sealing member and work for attaching the small sealing member can be avoided.

Since the gasket is held between the back end of the cylinder and the back end cover, to which the back end of the cylinder is joined, to make a sealed joint between the cylindrical member and the back end cover, the length of the boss of the back end cover to be fitted in the cylinder bore may be small and which enables forming the clamping cylinder actuator in a small length.

The cylinder may be formed from a generally cylindrical aluminum shape provided with a bore. The cylinder can be formed simply by cutting the aluminum shape in a desired length. The aluminum shape may be originally provided with an axial hole for unilateral piping and sensor holding grooves for holding sensors therein, which makes it possible to omit additional boring work. The sensors held in the sensor holding groove do not project outward from the outer circumference of the cylinder, the clamping cylinder actuator can be installed in a narrow space. The back end cover may be formed by processing an aluminum shape provided with grooves corresponding to the sensor holding grooves of the cylinder and holes for bolts. Therefore, the back end cover does not need any machining work for forming those grooves and holes and can be fabricated at a low cost. The aluminum shape for forming the cylinder may be formed by drawing. The cylinder bore can be formed by drawing with a high accuracy and does not need any machining, which reduces the cost of the clamping cylinder actuator. The front end cover may be formed of a ferrous material and magnets may be attached to the piston so as to be axially spaced a long distance apart from the front end cover. Magnetic fields created by the magnets are not affected by the front end cover and the sensor functions with reliability.

The front and the back end cover may be fastened to the front and the back end, respectively, of the cylinder with common bolts, and the bolts may be extended through longitudinal through holes formed in the cylinder. The bolts are concealed and the clamping cylinder actuator has an improved appearance. When the clamping cylinder actuator is used in a vertical position with the front end cover facing up, chips produced by machining a workpiece and fallen on the front end cover do not fill up threaded holes and chips can be smoothly removed.

The guide member holding member may be separate from the front end cover covering the front end of the cylinder, the guide member holding member may be provided with a guide member for guiding a rotary motion, and the front end cover may be used also as a front end cover that does not need any guide member. When rotary clamping cylinder actuators and axial clamping cylinder actuators are produced simultaneously, front end covers of the same type can be used for fabricating clamping cylinder actuators of different types, which is very advantageous from the viewpoint of part management and clamping cylinder actuators of different types can be manufactured at low manufacturing costs. Since the back end cover, the cylinder, the guide member holding member and the front end cover are fastened together with the same bolts, those components can be fastened together with a small number of bolts and the clamping cylinder actuator can be assembled by small man-hours.

The front end cover may be formed so as to be used in combination with the cylinders of clamping cylinder actuators of different types, and may be provided with ports in both its side surface and its back surface. Therefore, either the ports formed in the side surface or those formed in the back surface can be used for desired one of two piping systems, and the front end cover can be employed in clamping cylinder actuators of different piping systems, which reduces the kinds of parts. The front end cover may be used in combination with a cylinder provided with ports in its front portion. A piping system in the back end cover can be enabled by closing the ports formed in the side surface and the end surface of the front end cover, and different piping systems can be employed in clamping cylinder actuators of different operation types.

The cylinder of the clamping cylinder actuator may be covered with a sensor cover to water-proof the cylinder perfectly. Malfunctioning of the sensors embedded in the outer surface of the cylinder due to wetting with the cutting fluid can be surely prevented when the clamping cylinder actuator is used in an environment in which the cylinder is wetted continuously with the cutting fluid. A portion of the sensor cover corresponding to the outer circumference of the cylinder may be formed of a transparent material to enable the visual observation and checking of the operation of the sensors.

In a clamping cylinder actuator of a linkage type, the front end cover and a support pin can be formed of materials meeting functions required of the front end cover and the support pin, the front end cover can be used in combination with cylinders of different types, the support pin can be simply and firmly attached to the front end cover, and the clamping cylinder actuator can be formed in small dimensions at a low manufacturing cost.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

A clamping cylinder actuator in a first embodiment of the present invention will be described with reference to FIGS. 1 to 8.

Figure 1:
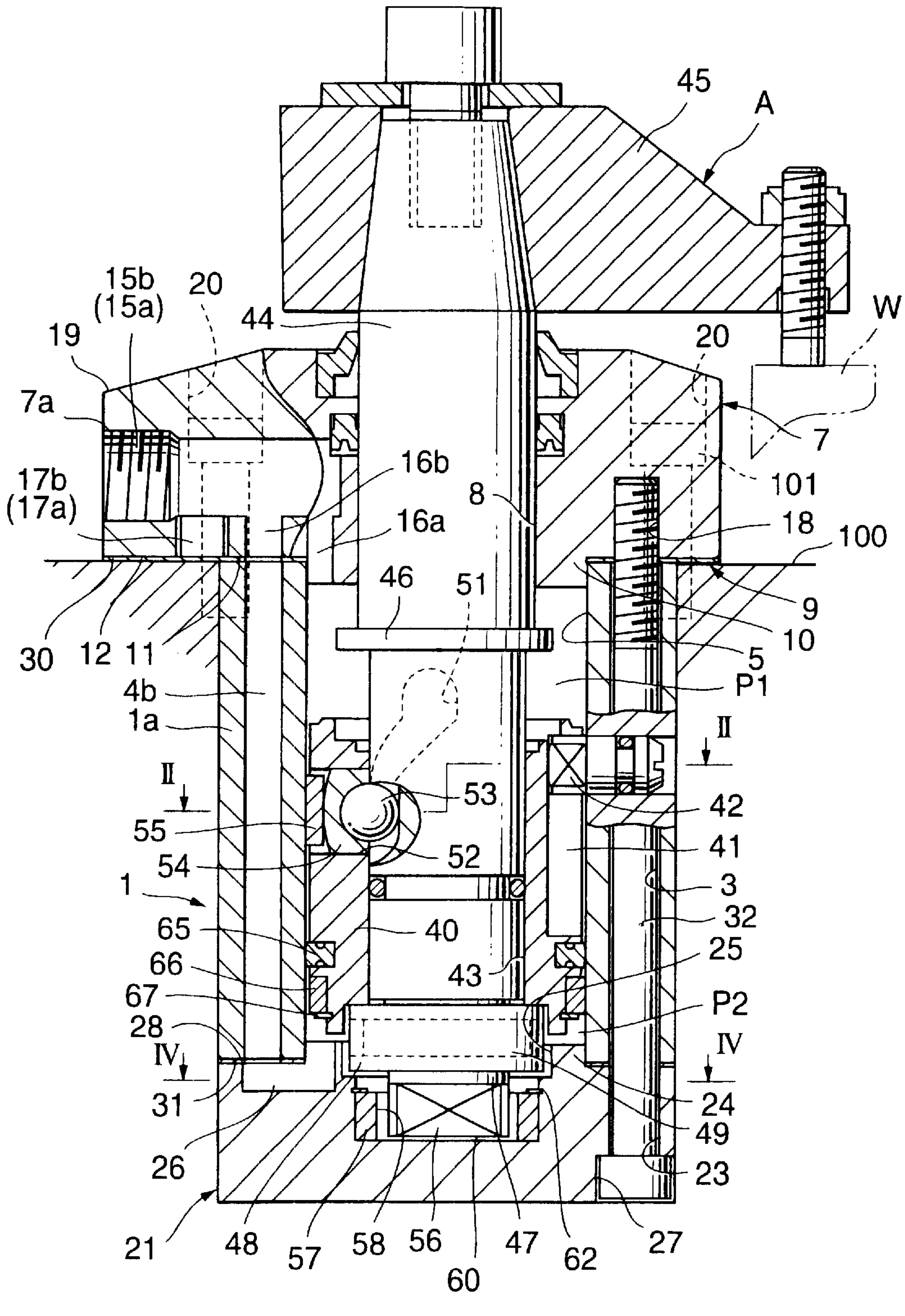
FIG. 1 is a longitudinal sectional view of a clamping cylinder actuator in a first embodiment of the present invention.
Figure 2:
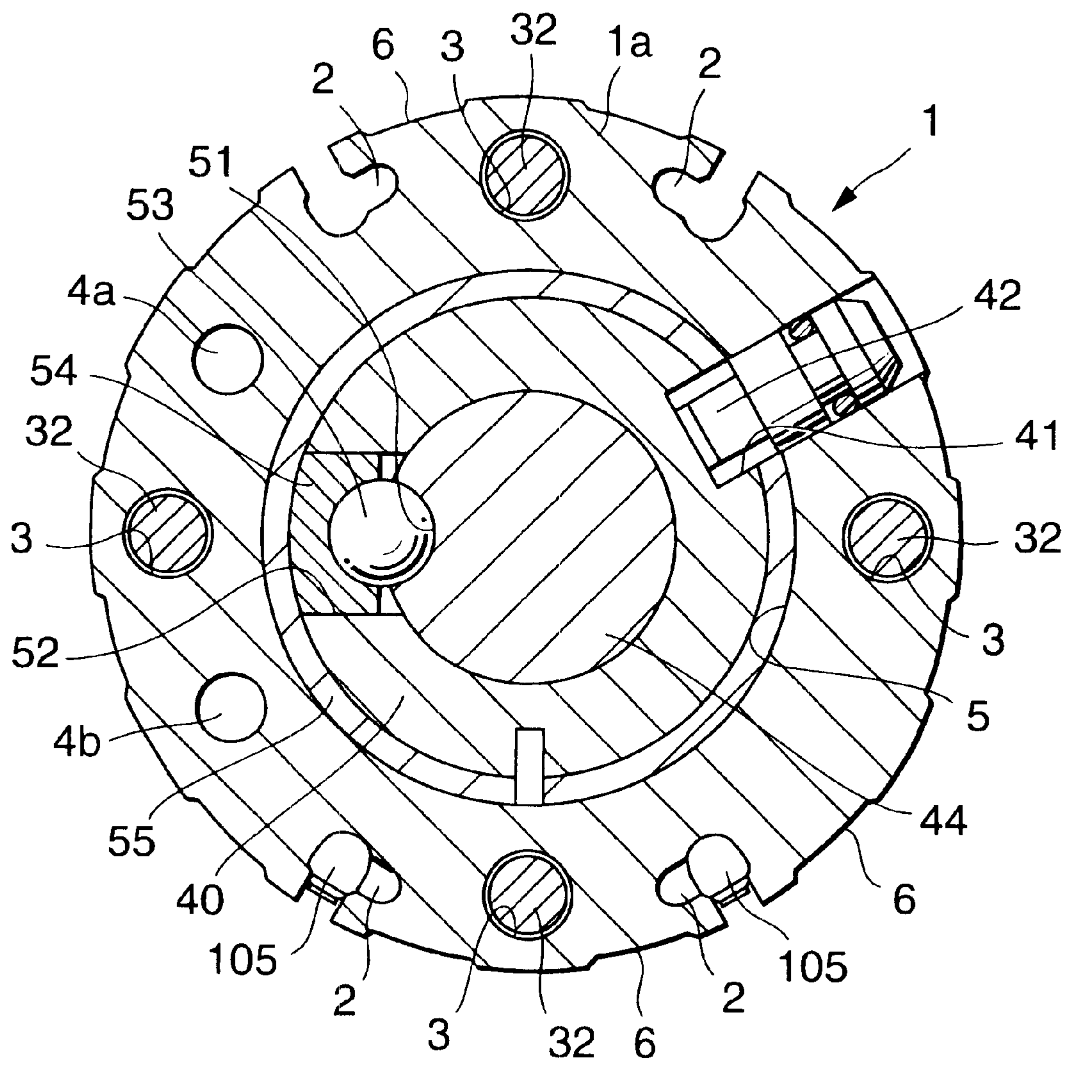
FIG. 2 is a sectional view taken on line II—II in FIG. 1.
Figure 3:
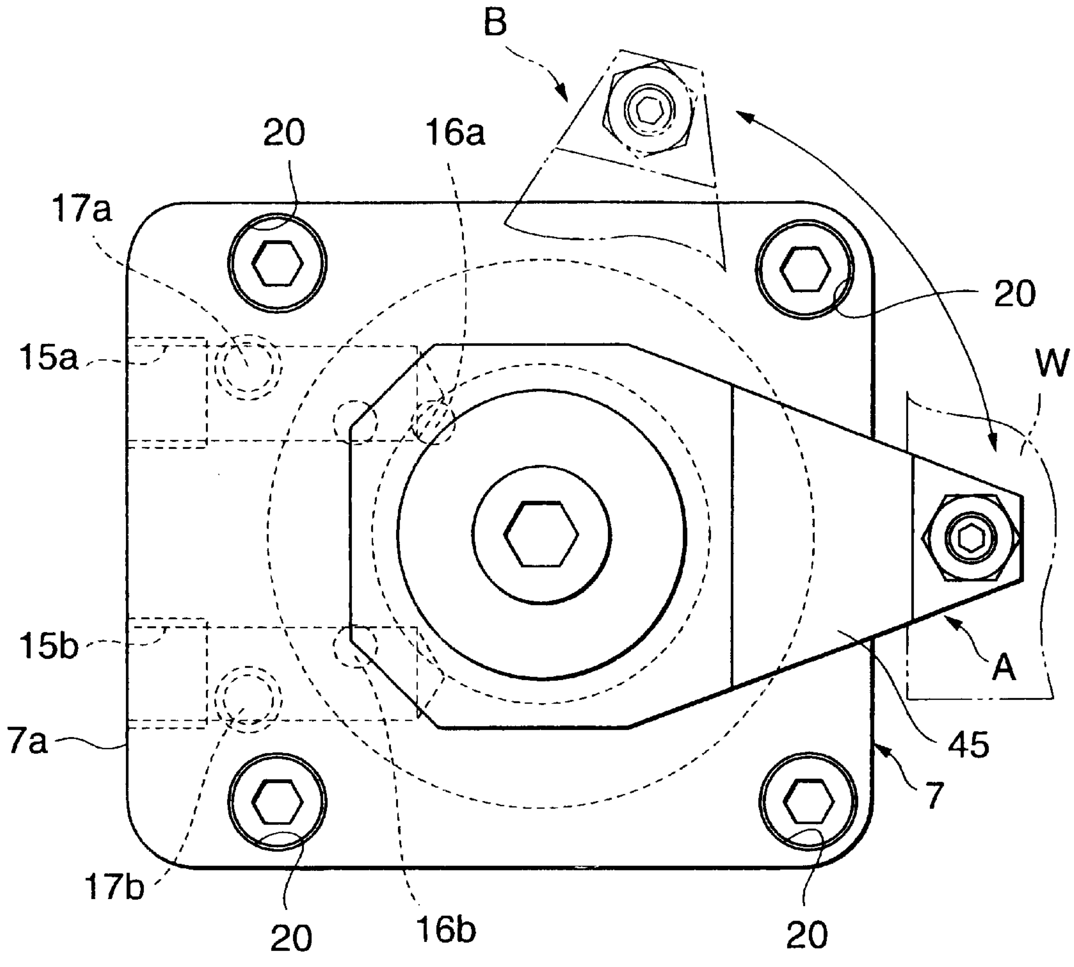
FIG. 3 is a plan view of the clamping cylinder actuator shown in FIG. 1.

Referring to FIG. 1, a substantially cylindrical cylinder (cylindrical member) 1 is formed by cutting an extruded or cold drawn aluminum shape in a desired length and has a side wall 1*a* defining a cylinder bore 5 and provided with longitudinal sensor holding grooves 2 in its outer surface, a plurality of longitudinal through holes 3 for bolts and ports 4*a* and 4*b* for unilateral piping to pass a fluid. When the cylinder 1 is formed by cutting an extruded aluminum shape, the cylinder bore 5 is finished by cold drawing with a very high dimensional accuracy. Whereas the cylinder bore of a cylinder formed by cutting an extruded aluminum shape needs finishing machining, the cylinder bore of a cylinder formed by cutting a cold drawn aluminum shape does not need any finishing machining at all and hence the cylinder can be produced at a low cost. The side wall 1*a* of the cylinder 1 is provided in its outer surface with a plurality of relatively wide, relatively shallow, longitudinal grooves 6 at angular intervals in addition to the sensor holding grooves 2. The grooves 6 ensure the firm grip of the cylinder 1 by the operator, make it difficult for the cylinder 1 to roll on a flat surface, facilitate handling the cylinder 1, reduce the area of portions of the outer surface of the cylinder 1 in a cylinder circumscribed about the cylinder 1 to make the outer surface of the cylinder 1 not subject to damaging and improve the appearance of the cylinder 1. A front end cover 7 has a hole 8 through which a piston rod 44 is extended. Since the piston rod 44 slides along the side wall of the hole 8, the front end cover 7 is formed of a an abrasion-resistant ferrous material, such as a perlitic ductile cast iron. As shown in FIG. 3, the front end cover 7 has a substantially rectangular shape radially extending beyond the peripheral boundary of the cylinder 1 and is provided on its back surface 9 with a short boss 10 fitting the cylinder bore 5. A section of the back surface 9 facing the front end surface of the cylinder 1 is a sealing surface 11. A section of the back surface 9 surrounding the sealing surface 11 is a joining surface 12 flush with the sealing surface 11. The joining surface 12 is joined to a fixed member 100, such as a base of a machine.

A first side port 15*a* and a second side port 15*b* open in the side surface 7*a* of the front end cover 7. The first side port 15*a* is connected to a first connecting passage 16*a* opening in the back end (lower end as viewed in FIG. 1) of the boss 10 and communicating with a front cylinder chamber P1. The second side port 15*b* opens in the sealing surface 11 and is connected to a second passage 16*b* communicating with the port 4*b* of the cylinder 1. A first end port 17*a* and a second end port 17*b* opening in the joining surface 12 communicate with the first side port 15*a* and the second side port 15*b,* respectively. Bottomed threaded holes 18 are formed in a predetermined depth in the back surface 9 of the front end cover 7 so as to correspond to the through holes 3 for bolts of the cylinder 1. The front surface (the surface from which the piston rod 44 projects outside) 19 of the front end cover 7 is formed in a conical surface declining toward the periphery. Bolt holes 20 for bolts that fastens the front end cover 7 to a fixed member 100, such as a base of a machine, are formed in the front surface 19 of the front end cover 7.

Figure 4:
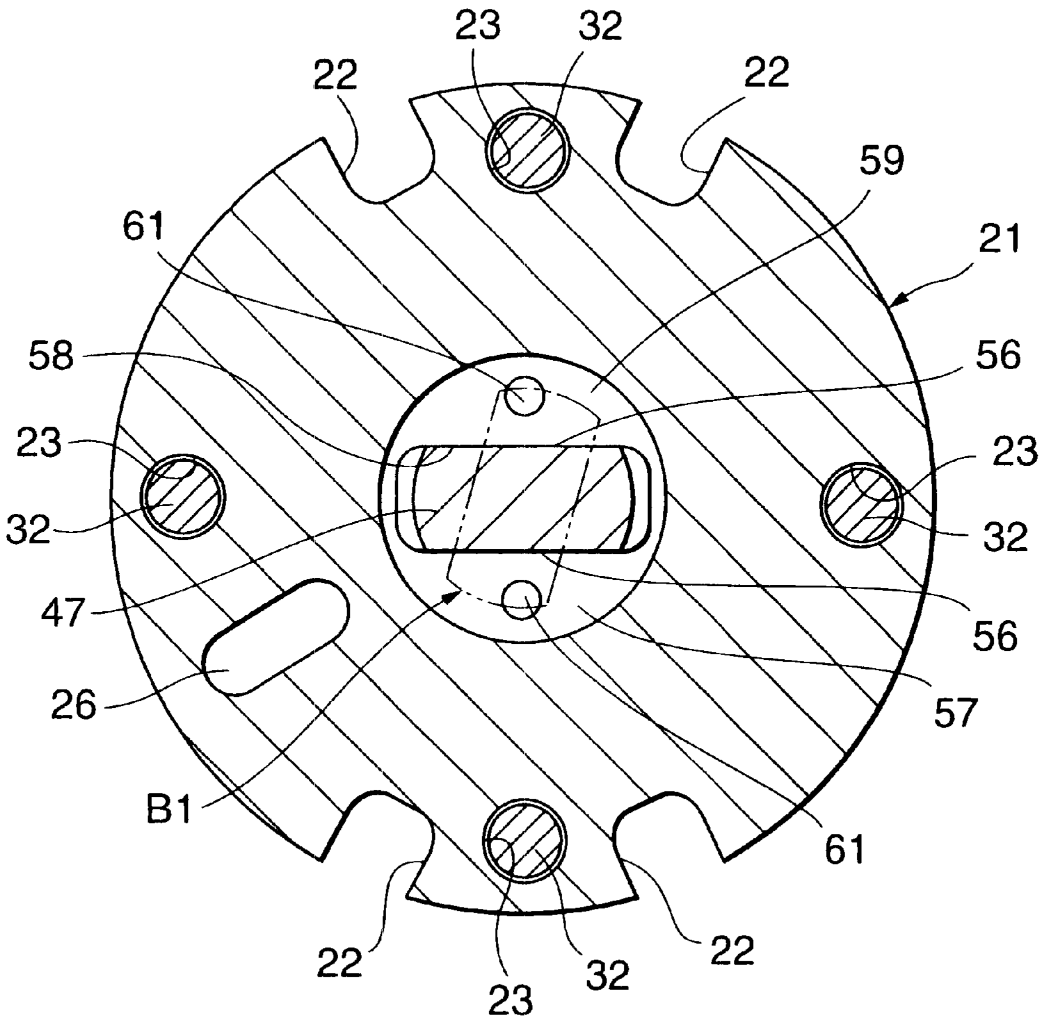
FIG. 4 is a sectional view taken on line IV—IV in FIG. 1.
Figure 5:
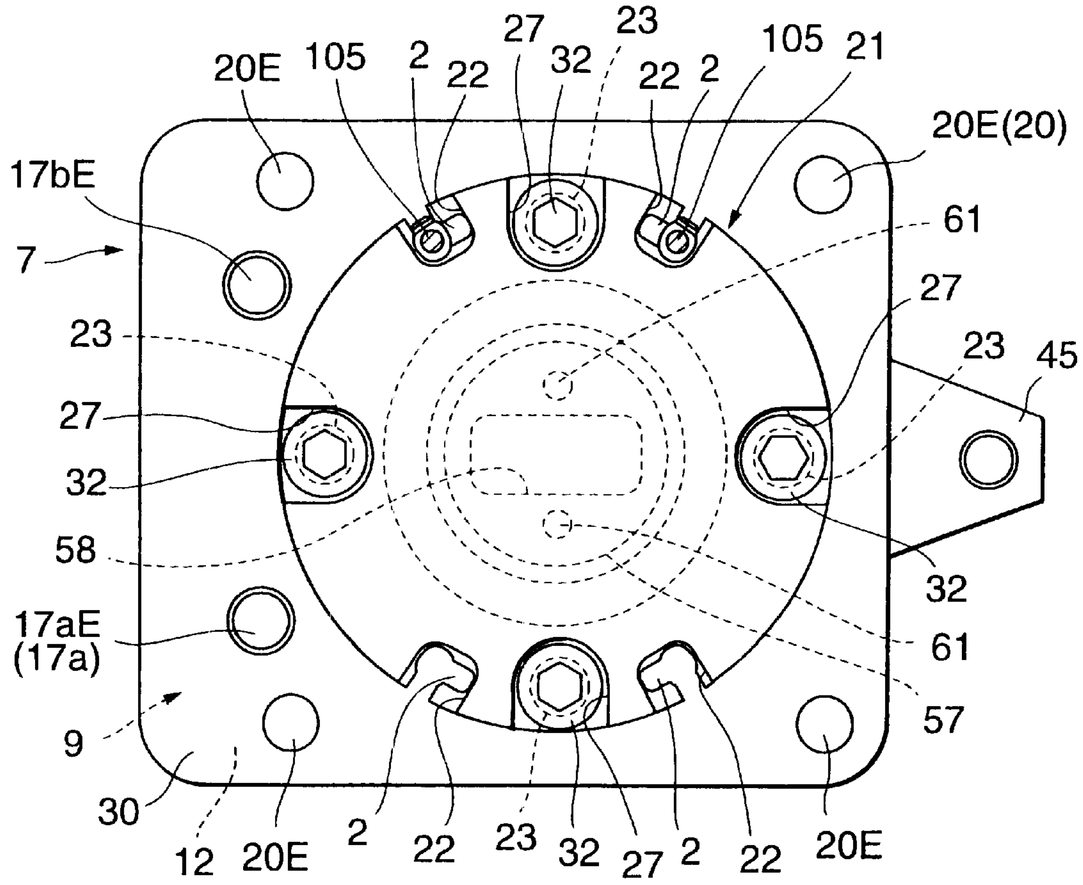
FIG. 5 is a view taken in the direction of the arrow V in FIG. 1.

Referring to FIGS. 4 and 5, a back end cover 21 that covers the back end (the lower end as viewed in FIG. 1) of the cylinder 1 is provided with a sensor passing grooves 22 through which sensors 105 are inserted longitudinally into the sensor holding grooves 2, and bolt holes 23 corresponding to the through holes 3. The back end cover 21 is formed by processing a drawn aluminum shape. A workpiece of predetermined thickness is cut from the drawn aluminum shape, and the workpiece is machined to form a short boss 24 that is fitted in the cylinder bore 5, a stepped recess 25 for receiving a back end portion of the piston rod 44, a connecting groove 26 for connecting a back cylinder chamber P2 and the port 4*b,* and counterbores 27 around the rims of the bolt holes 23. The front surface of the back end cover 21 facing the cylinder 1 is finished in a sealing surface 28. The connecting groove 26 is formed in the boss 24 and the sealing surface 28. Side walls of the bolt holes 23 may be partly broken. In this embodiment, the port 4*a* is not used.

Figure 6:
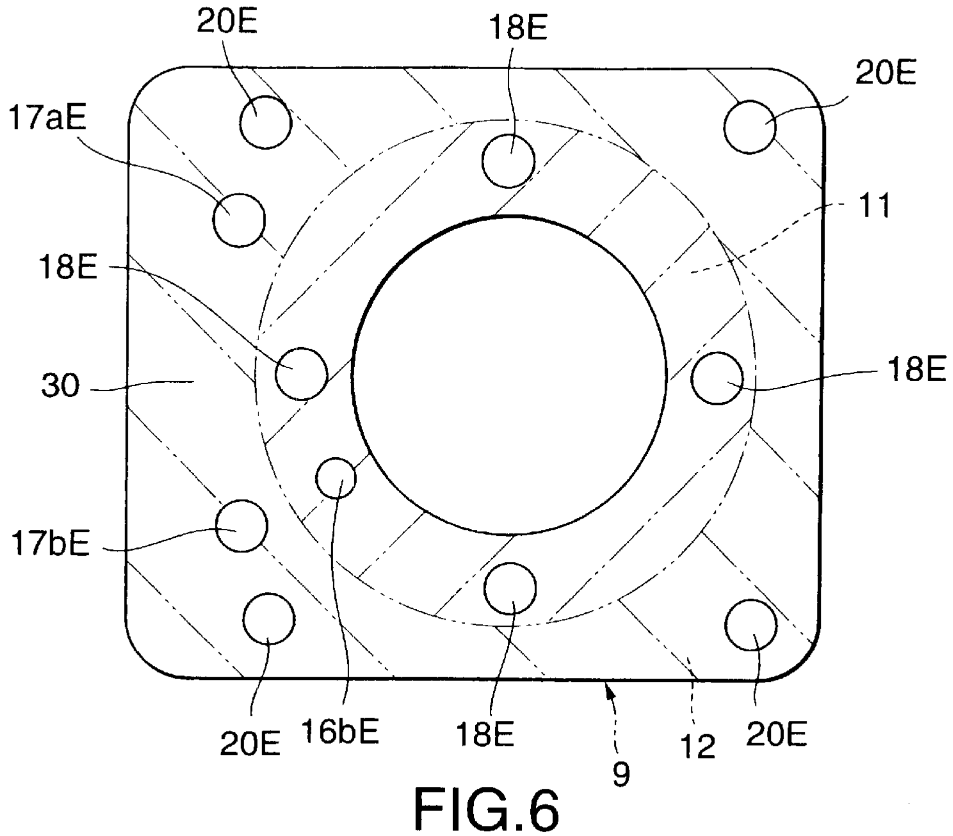
FIG. 6 is a plan view of a front gasket included in the clamping cylinder actuator shown in FIG. 1 as placed on a sealing surface and a joining surface.
Figure 7:
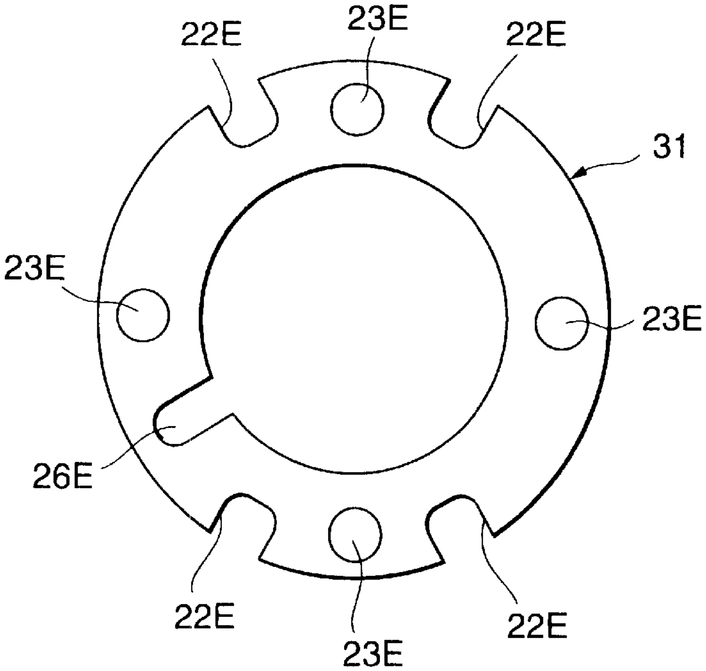
FIG. 7 is a plan view of a back gasket included in the clamping cylinder actuator shown in FIG. 1.

Thin, flat gaskets 30 and 31 are sandwiched between the back surface 9 of the front end cover 7 and the front end surface (upper end surface) of the cylinder 1 and between the back end cover 21 and the back end surface (lower end surface) of the cylinder 1, respectively. Each of the gaskets 30 and 31 is formed by sandwiching a thin metal sheet, such as a thin aluminum or steel sheet, between elastic sealing sheets of an elastic rubber or the like. As shown in FIG. 7, the gasket 31 held between the back end cover 21 and the cylinder 1 is provided with cuts 22E formed in an outer peripheral portion thereof so as to correspond to the sensor holding grooves 22, holes 23E formed so as to correspond to the bolt holes 23, and a recess 26E formed in an inner peripheral portion thereof so as to correspond to the connecting groove 26. The gasket 31 is fitted on the boss 24. As shown in FIG. 6, the gasket 30 held between the front end cover 7 and the cylinder 1 is provided with holes 18E, 16*b*E, 17*a*E, 17*b*E and 20E respectively corresponding to the threaded holes 18, the second passage 16*b,* the end ports 17*a* and 17*b,* and the bolt holes 20. The gasket 30 is fitted on the boss 10 and extends over the sealing surface 11 and the joining surface 12 surrounding the sealing surface 11. Incidentally, although the gasket 30 shown in FIG. 6 is meant to cover the entire of the joining surface 12, the gasket 30 may cover only a part of the joining surface 12.

The front end cover 7, the gasket 30, the cylinder 1, the gasket 31 and the back end cover 21 are arranged in that order, four bolts 32 are passed through the bolt holes 23 of the back end cover, are extended through the through holes 3 of the cylinder 1 and are screwed in the threaded holes 18 of the front end cover 7 so that the front end cover 7, the gasket 30, the cylinder 1, the gasket 31 and the back end cover 21 are fastened together to form a cylinder assembly. The gaskets 30 and 31 make sealed joints between the front end cover 7 and the cylinder 1 and between the back end cover 21 and the cylinder 1, respectively. Incidentally, the back end cover 21 may be formed integrally with the cylinder 1 so that the gasket 31 is omitted.

A hollow piston 40 is fitted in the cylinder bore 5 so as to be axially movable. A guide groove 41 is formed in the outer circumference of the piston 40 and a guide pin 42 attached to the cylinder 1 engages in the guide groove 41 to restrain the piston 40 from turning and to allow the piston 40 to move only axially. The piston rod 44 is inserted in the central bore 43 of the piston 40. The piston rod 44 is able to rotate and to move axially relative to the piston 40. The piston rod 44 extends through the hole 8 of the front end cover 7 and projects forward from the front end cover 7. A clamping arm 45 is fastened to a front end portion of the piston rod 44 projecting from the front end cover 7. An annular ridge 46 for determining the front end position of the piston 40 relative to the piston rod 44 is secured to the piston rod 44. A reduced portion 47 is formed in a back end portion of the piston rod 44. A stopping member 48 for determining the back end position of the piston 40 relative to the piston rod 44 is mounted on the reduced portion 47 and is retained on the reduced portion 47 by a retaining pin 49. A back end portion of the reduced portion 47 projects backward from the stopping member 48.

A helical guide groove (cam groove) 51 of a semicircular cross section is formed in the outer circumference of the piston rod 44. The piston 40 is provided with a radial hole 52. A bearing member 54 formed of phosphor bronze is fitted in the radial hole 52, and a wear ring 55 is interposed between the bearing member 54 and the cylinder 1. A steel ball 53 supported for rolling in the bearing member 54 engages in the helical guide groove 51. As shown in FIGS. 1 and 3, when the piston 40 moves from the back end position to the front end position relative to the piston rod 44 with a flat sided end portion 56 having a pair of opposite flats moved out of a slot 58 formed in a bushing 57 fixed to the back end cover 21, the piston rod 44 fixedly holding the clamping arm 45 is turned from a clamping angular position A to an unclamping angular position B (FIGS. 3 and 8) because the steel ball 53 is engaged in the helical guide grove 51. When the piston 40 moves from the front end position to the back end position relative to the piston rod 44, the piston rod 44 is turned from the unclamping angular position B to the clamping angular position A.

The flat sided end portion 56 is formed in a predetermined longitudinal length in a back end portion (lower end portion) of the reduced portion 47. The flat sided end portion 57 restrains the piston rod 44 from turning when the clamping arm 45 is at the clamping angular position A and the flat sided end portion 57 is fitted in the slot 58 of the bushing 57 fixed to the back end cover 21 (FIGS. 1 and 4). In a state where the flat sided portion 56 is moved axially out of the slot 58 and the piston rod 44 is turning from the unclamping angular position B toward the clamping angular position A, the back end surface 60 of the reduced portion 47 comes into contact with the front end surface (upper end surface) 59 of the bushing 57 to stop the backward movement of the piston rod 44. The bushing 57 is formed of a ferrous material. The bushing 57 is restrained from turning relative to the back end cover 21 with a pair of pins 61 fixed to the back end cover 21 and is retained in the recess 25 with a C-type snap ring 62.

An annular magnet 66 for sensors is attached to the piston 40 at a position spaced away from a seal member 65 opposite the front end cover 7. The inside diameter of the magnet 66 is larger than the outside diameter of the stopping member 48 and is retained with a C-type snap ring 67.

Since the thin gaskets 30 and 31 are used to make sealed joints between the back surface 9 of the front end cover 7 and the front end surface (upper end surface) of the cylinder 1 and between the back end cover 21 and the back end surface (lower end surface) of the cylinder 1, respectively, the boss 10 of the front end cover 7 and the boss 24 of the back end cover 21 fitted in the cylinder bore 5 do not need to be provided with any O ring and do not need to be in a big length sufficient for forming a groove for receiving an O ring therein. Consequently, the cylinder assembly can be formed in a relatively small length. The front end cover 7 and the back end cover 21 are fastened to the front and the back end of the cylinder 1, respectively, with the bolts 32 passed from the side of the back end cover 21 through the cylinder 1 and screwed in the threaded holes 18 of the front end cover 7. Therefore, the number of the bolts 32 may be small. Since the threaded holes 18 are bottomed, chips produced by machining a workpiece and fallen on the front end cover 7 do not fill up threaded holes 18 when the clamping cylinder actuator is used in a vertical position with the front end cover 7 facing up and chips can be smoothly removed. Since the bolts 32 are extended through the longitudinal through holes 3 formed in the cylinder 1, the bolts 32 are concealed and the clamping cylinder actuator has an improved appearance. Since the cylinder 1 is made from an aluminum shape and the side wall la of the cylinder 1 is originally provided with the through holes 3 for receiving the bolts 32 passed from the side of the back end cover 21 toward the front end cover 7, any machining work for forming the through holes 3 in the cylinder 1 is not necessary, the cylinder 1 can be obtained simply by cutting the aluminum shape in a desired length. The back end cover 21 can be easily formed by subjecting a workpiece of a predetermined thickness obtained by cutting a drawn aluminum shape originally having grooves and holes corresponding to the sensor holding grooves 22 and the bolt holes 23 to some additional machining. Although the back end cover 21 is formed from an aluminum shape, the bushing 57 that restrains the piston rod 44 from turning is formed of a ferrous material and fitted in the recess 25 formed in the back end cover 21. The bushing 57 of a ferrous material is highly durable even though the flat sided portion 56 and the back end surface 60 of the piston rod 44 come into sliding contact with the bushing 57.

The clamping cylinder actuator is held on the fixed member 100, such as the base of a machine or a jig, by fixing the front end cover 7 to the fixed member 100 with bolts 101. Since the gasket 30 is sandwiched between the joining surface 12 of the front end cover 7 and the fixed member 100, the bolts 101 fastening the front end cover 7 to the fixed member 100 will not be loosened by vibrations generated by a machining operation because the gasket 30 is elastic and hence the clamping cylinder actuator is able to achieve its function with reliability. Since the gasket 30 is held between the joining surface 12 and the fixed member 100, the cutting fluid wetting the front end cover 7 is unable to flow over the outer surface of the cylinder 1 and, consequently, magnetic sensors held in the sensor holding grooves 22 of the cylinder 1 can be protected from the cutting fluid. Since the portion of the gasket 30 extending over the joining surface 12 serves also as a sealing member for sealing the end ports 17*a* and 17*b,* any O rings are not necessary. A sealed joint is made between the end ports and the fixed member when the end port is not used. When pipes are connected to the end ports, the gasket makes a sealed joint between the pipes and the end ports. Since any small sealing member, such as an O ring, is not used for sealing the end port, troubles attributable to the loss of a sealing member and work for attaching the small sealing member can be avoided. When pipes are connected to the end ports 17*a* and 17*b,* the side ports 15*a* and 15*b* are filled with plugs. The gasket 30 serves as a sealing member for making a sealed joint between the end ports 17*a* and 17*b,* and the pipes. When the gasket 30 is unable to seal the end ports 17*a* and 17*b* in a case where pipes are connected to the side ports 15*a* and 15*b,* and the end ports 17*a* and 17*b* do not face the fixed member 100 or the fixed member 100 has a rough joining surface, the end ports 17*a* and 17*b* are filled with plugs.

Figure 8:
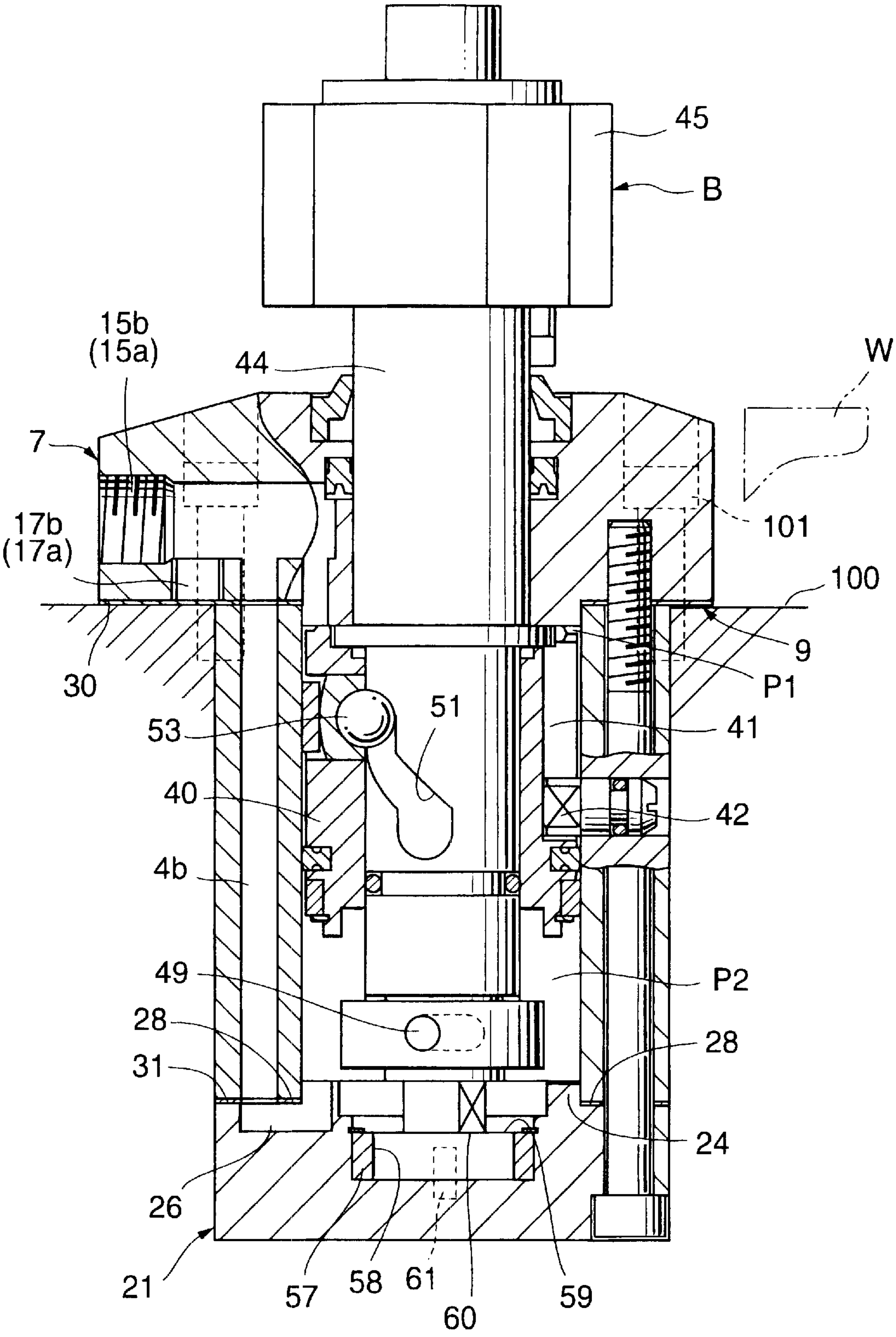
FIG. 8 is a longitudinal sectional view of the clamping cylinder actuator in an unclamping state.

The operation of the clamping cylinder actuator in the first embodiment will be described on an assumption that the clamping cylinder actuator is set in a vertical position, the end ports 17*a* and 17*b* are closed by the fixed member 100 and the side ports 15*a* and 15*b* are used for supplying a working fluid into and discharging the same from the clamping cylinder actuator. When the working fluid is supplied into the front cylinder chamber P1 through the first side port 15*a* and the first connecting passage 16*a* in a state where the flat sided portion 56 is outside the bushing 57 and the piston rod 44 is at the unclamping angular position B as shown in FIG. 8, the piston 40 moves backward relative to the piston rod 44 from the front end position. Since the phase angle of the flat sided portion 56 is different from that of the slot 58 as indicated by a two-dot chain line B1 in FIG. 4, the back end surface 60 of the piston rod 44 comes into contact with the front end surface 59 of the bushing 57, so that the piston rod 44 is unable to move backward. Meanwhile, the steel ball 53 moves along the helical groove 51 to turn the clamping arm 45 in a horizontal plane from the unclamping angular position B to the clamping angular position A. Since the steel ball 53 is supported for rolling in the bearing member 54 of phosphor bronze, the steel ball 53 undergoes a very low rolling resistance when the same moves along the helical guide groove 51 and hence the piston 40 can be moved by the working fluid of a relatively low pressure. Upon the arrival of the clamping arm 45 at the clamping angular position A, piston 40 is stopped by the stopping member 48, the angular phase of the flat sided portion 56 coincides with that of the slot 58. As the piston 40 is pressed further backward by the working fluid, the flat sided portion 56 is fitted into the slot 58 of the bushing 57, the piston 40 and the stopping member 48 move backward together to clamp a workpiece W in place as shown in FIG. 1. The piston rod 44 holding the clamping arm 45 is unable to turn because the flat sided portion 56 of the piston rod 44 is fitted in the slot 58 of the bushing 57.

When the working fluid is supplied through the ports 4*b* and the connecting groove 26 into the back cylinder chamber P2 in a state where the flat sided portion 56 is fitted in the slot 58 of the bushing 57 and the piston rod 44 is held at the clamping angular position A to clamp the workpiece W in place, the piston rod 44 restrained from turning by the engagement of the flat sided portion 56 in the slot 58 of the bushing 57 moves axially forward together with the piston 40, whereby the clamping arm 45 is linearly moved away from the workpiece W at the clamping angular position A and is separated from the workpiece W. At the moment when the flat sided portion 56 moves out of the slot 58 of the bushing 57, an annular ridge 46 formed on the piston rod 44 comes into contact with the boss 10 of the front end cover 7, whereby the forward movement of the piston rod 44 is stopped. As the piston 40 moves further forward in this state, the piston rod 44 is turned by the guiding effect of the helical guide groove 51 engaging the steel ball 53 and, consequently, the clamping arm 45 is turned in a horizontal plane from the clamping angular position A to the unclamping angular position B.

The magnetic sensors 105 are held in the sensor holding grooves 2 of the cylinder 1 corresponding to the positions of a magnet 66 attached to the piston 40 when the clamping arm 45 is at the clamping angular position A to clamp the workpiece W and when the clamping arm 45 is at the unclamping angular position B, respectively. The magnetic sensors 105 provide detection signals in a state where the clamping arm 45 is at the clamping angular position A and in a state where the same is at the unclamping position B. The stopping member 48 attached to the piston rod 44 is formed of a nonmagnetic material, such as an aluminum alloy, the back end cover 21 is formed of aluminum, and the outside diameter of the bushing 57 of a ferrous material is smaller than the inside diameter of the magnet 66. Therefore, the intensity of a magnetic field created by the magnet 66 is not affected and is not reduced by the bushing 57, and hence the magnetic sensors 105 function with reliability. Since the magnetic sensors 105 are held in the sensor holding grooves 2 and do not project from the outer circumference of the cylinder 1, the clamping cylinder actuator can be installed in a relatively narrow space.

Second Embodiment

Figure 9:
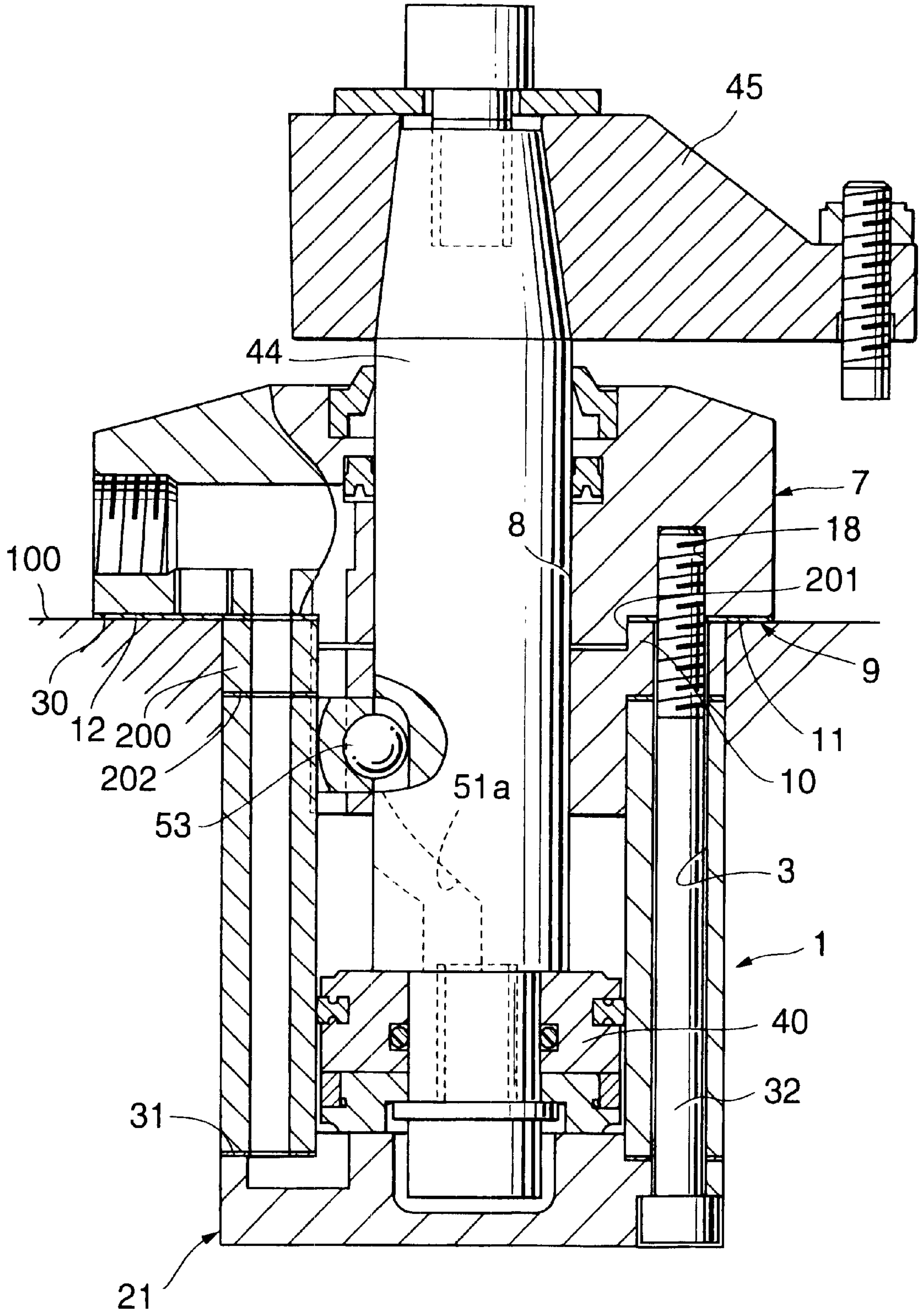
FIG. 9 is a longitudinal sectional view of a clamping cylinder actuator in a second embodiment of the present invention.

A clamping cylinder actuator in a second embodiment of the present invention will be described with reference to FIG. 9. Referring to FIG. 9, the clamping cylinder actuator has a front end cover 7, a cylinder 1, a guide member holding member 200 interposed between the front end cover 7 and the cylinder 1, a back end cover 21, a gasket 30 held between the front end cover 7 and the guide member holding member 200, a gasket 31 held between the cylinder 1 and the back end cover 21, and a gasket 202 held between the cylinder 1 and the guide member holding member 200. The front end cover 7 has a short boss 10 fitted in the bore 201 of the guide member holding member 200. Those members are fastened together, similarly to the corresponding members of the clamping cylinder actuator in the first embodiment, to form a cylinder assembly by passing four bolts 32 from the side of the back end cover 21 through holes formed in the back end cover 21 and four through holes 3 formed in the cylinder 1 and screwing the same in bottomed threaded holes 18 formed in the front end cover 7. The gaskets 30, 202 and 31 make sealed joints between the front end cover 7 and the guide member holding member 200, between the guide member holding member 200 and the cylinder 1 and between the cylinder 1 and the back end cover 21, respectively. In this second embodiment, the cylinder 1 and the guide member holding member 200 constitute a cylindrical member. The gasket 30 held between the front end cover 7 and the guide member holding member 200, similarly to the gasket 30 of the first embodiment, extends over a sealing surface 11 of the back surface 9 of the front end cover 7 facing the guide member holding member 200 and a joining surface 12 of the back surface 9 of the front end cover 7 surrounding the sealing surface 11. In the second embodiment, as well as in the first embodiment, the gasket 30 serves as means for preventing the loosening of bolts and means for sealing ports, not shown in FIG. 9, formed in the back surface 9 of the front end cover 7.

A piston rod 44 extends through the hole 8 of the front end cover 7 and projects forward from the front end cover 7. A clamping arm 45 is fastened to a front end portion of the piston rod 44 projecting from the front end cover 7. A piston 40 is fitted on a back portion of the piston rod 44 so as to be rotatable relative to the piston rod 44. The piston rod 44 is provided in its circumference with a helical guide groove 51*a,* and a steel ball 53 held by the guide member holding member 200 engages in the helical guide groove 51*a*. When the piston 40 is moved from a back end position shown in FIG. 9 toward a front end position, the piston rod 44 is turned about its axis by the cam action of the helical guide groove 5*a* and the steel ball 53. Consequently, the clamping arm 45 fastened to the piston rod 44 turns and moves axially from a clamping position where the clamping arm 45 clamps a workpiece in place toward an unclamping position where the clamping arm 45 is separated from the workpiece. When the piston 40 is moved from the front end position toward the back end position, the clamping arm 45 turns and moves axially from the unclamping position toward the clamping position to clamp the workpiece.

Third Embodiment

Figure 10:
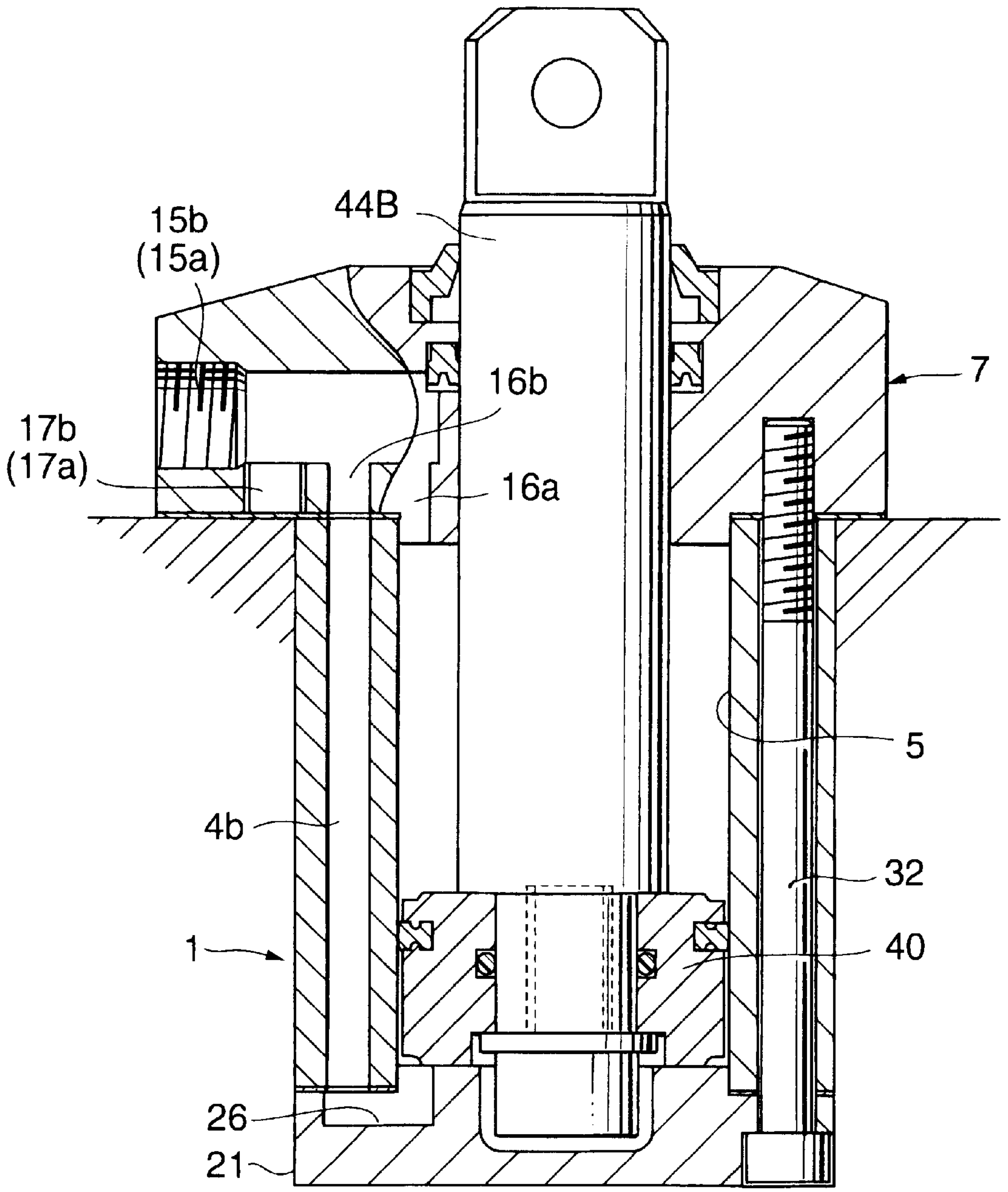
FIG. 10 is a longitudinal sectional view of a clamping cylinder actuator (of a different operation type) in a third embodiment of the present invention.

A clamping cylinder actuator in a third embodiment of the present invention will be described with reference to FIG. 10. The claming cylinder actuator shown in FIG. 10 has a piston rod 44B that is moved axially and does not turn. The clamping cylinder actuator in the third embodiment differs from those in the first and the second embodiment in not being provided with any internal turning mechanism. If a cylinder 1 is formed from the same aluminum shape as the cylinders 1 of the first and the second embodiment, the diameter of the cylinder bore 5 of the cylinder 1 is equal to those of the cylinder bores 5 of the cylinders 1 of the first and the second embodiment, and the diameter of the piston rod 44B is equal to those of the piston rods 44 of the first and the second embodiment, a front end cover 7 included in the clamping cylinder actuator in the third embodiment is the same in dimensions and shape as those of the first and the second embodiment. The front end cover 7 is the same as those of the foregoing embodiments in the arrangement of side ports and end ports, and the clamping cylinder actuator may be provided with a back end cover 21 similar to that of the first or the second embodiment. Thus, piping systems in the front end cover 7 and the back end cover 21 can be enabled.

Fourth Embodiment

Figure 11:
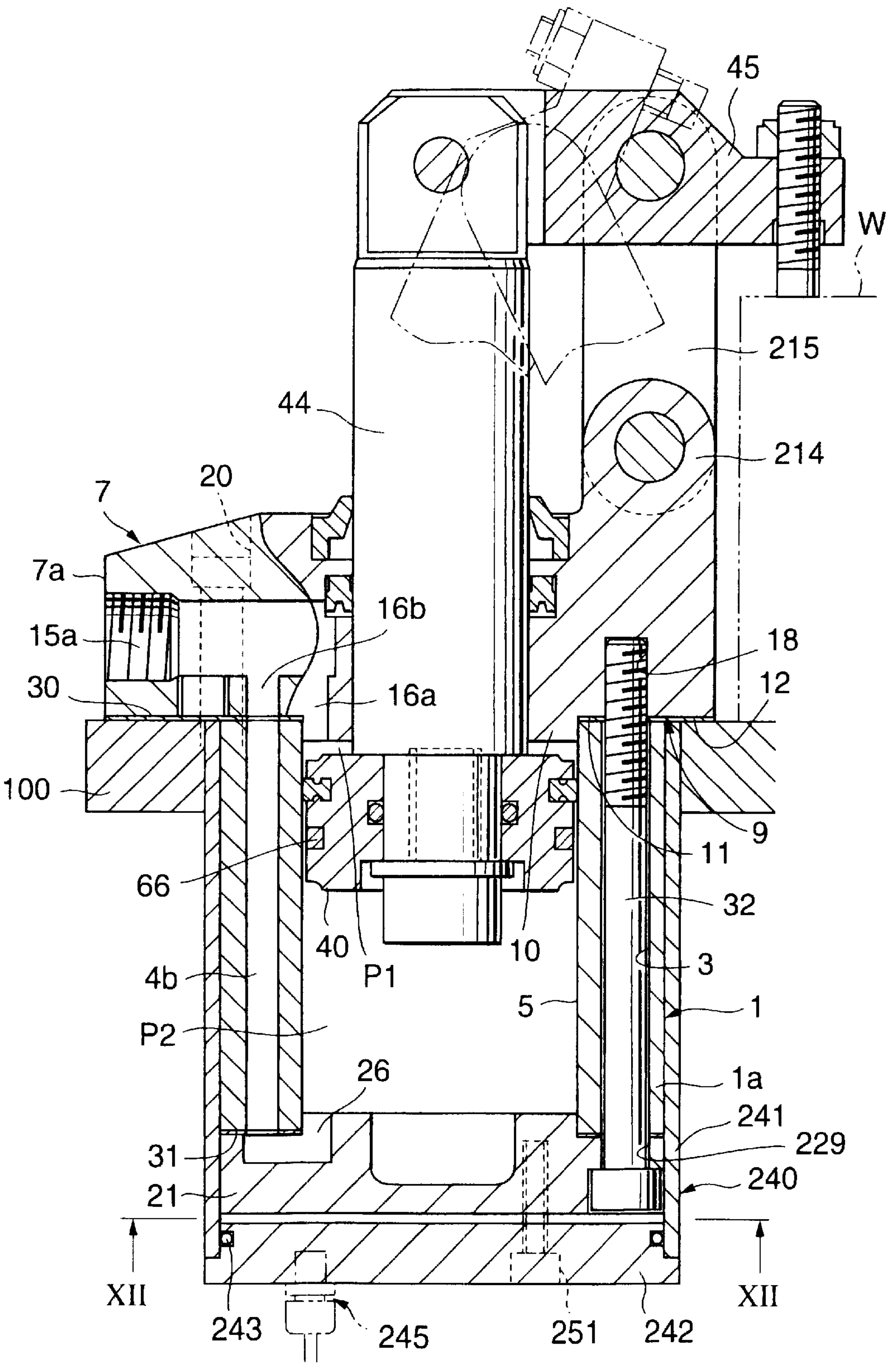
FIG. 11 is a longitudinal sectional view of a clamping cylinder actuator (provided with a sensor cover) in a fourth embodiment of the present invention.
Figure 12:
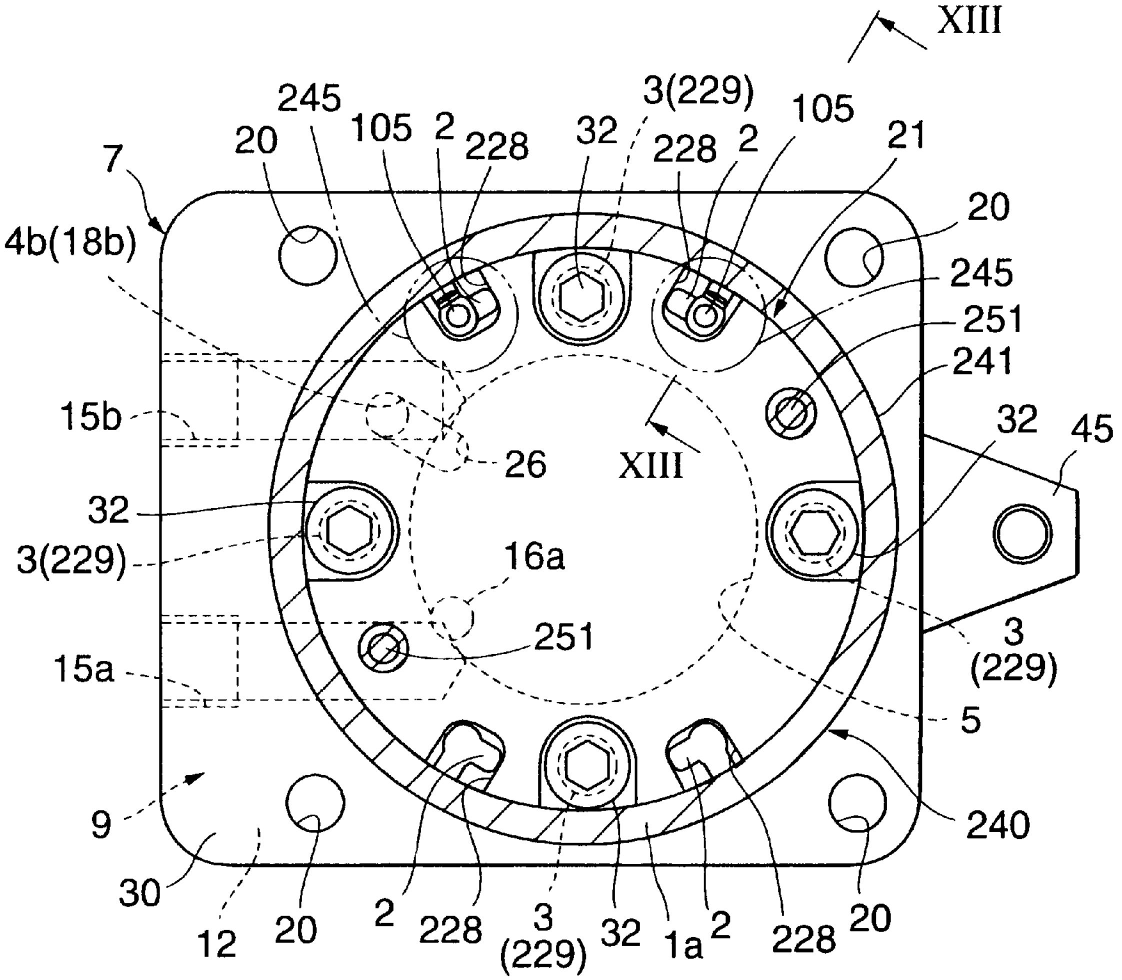
FIG. 12 is a sectional view taken on line XII—XII in FIG. 11.
Figure 13:
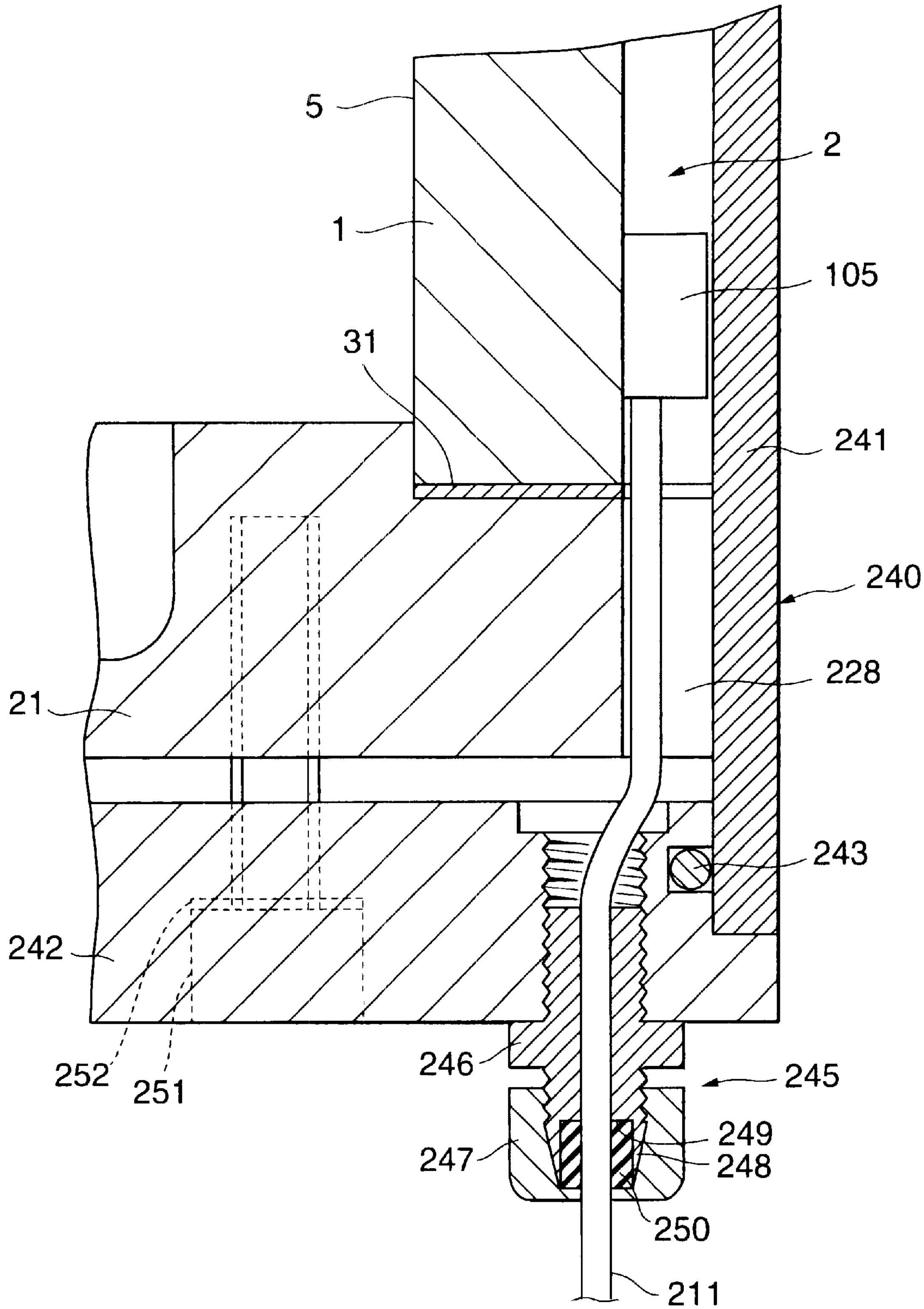
FIG. 13 is a sectional view taken on line XIII—XIII in FIG. 12.

A clamping cylinder actuator in a fourth embodiment of the present invention will be described with reference to FIGS. 11 to 13. A clamping cylinder actuator in the fourth embodiment is of a type different from those of the clamping cylinder actuators in the first to the third embodiment. As shown in FIG. 11, the clamping cylinder actuator has a cylinder 1 and a sensor cover 240 covering the cylinder 1 in a watertight fashion. The sensor cover 240 has a cylindrical side covering member (first covering member) 241 formed from a transparent pipe, such as a transparent acrylic resin pipe, closely put on the cylinder 1, and an end covering member (second covering member) 242 closing the back end of the cylindrical side covering member 241 on the side of a back end cover 21 attached to the back end of the cylinder 1. A sensor 105 provided with an optical indicator that emits light and held in a sensor holding groove formed in the cylinder 1 can be seen through the transparent cylindrical side covering member 241. The joint of the end covering member 242 and the cylindrical side covering member 241 is sealed by a sealing member 243, such as an O ring, in a watertight fashion. As shown in FIG. 13, a cable lead-in device 245 is attached to the end covering member 242. A cable 211 passed through the cable lead-in device 245 is connected to the sensor 105.

As shown in FIG. 13, the cable lead-in device 245 has a main part 246 having a threaded outer portion screwed in a threaded hole formed in the end covering member 242 in a watertight fashion, a packing 250 packed in a packing bore 248 formed in an outer end portion of the main part 246, and a cap 247 screwed on a threaded outer portion of the main part 246. The cable 211 is passed through the bore of the main part 246 and the packing 250, the cap 247 is fastened to the threaded outer portion of the main part 246 to compress the packing 250 and the cable 211 radially by an outer end portion 249 of the main part 246.

The cylinder 1 of the clamping cylinder actuator is fitted in the cylindrical side covering member 241 of the sensor cover 240, the end covering member 242 is fitted in the back end of the cylindrical side covering member 241, and the end covering member 242 is fastened to the back end cover 21 with screws 251. As shown in FIG. 13, a gasket 252 is placed between the head of each screw 251 and the end covering member 242 for watertight sealing. A space is formed between the back end cover 21 and the end covering member 242 put in place on the cylindrical side covering member 241. Therefore, when the screws 251 are fastened, the front end of the cylindrical side covering member 241 is pressed against a gasket 30 put on the back surface of a front end cover 7 for watertight sealing. The cable 211 connected to the sensor 105 is extended outside through the cable lead-in device 245. Since the cylinder 1 holding the sensor 105 and sealed in the sensor cover 240 is thus perfectly water-proofed, the sensor 105 held on the cylinder 1 is never wet with a cutting fluid even if the clamping cylinder actuator is used in an environment in which the clamping cylinder actuator is exposed constantly to the cutting fluid. Consequently, the possibility of the malfunctioning of the sensor 105 can be effectively reduced.

Fifth Embodiment

A clamping cylinder actuator in a fifth embodiment of the present invention will be described with reference to FIGS. 14 to 16.

Figure 14:
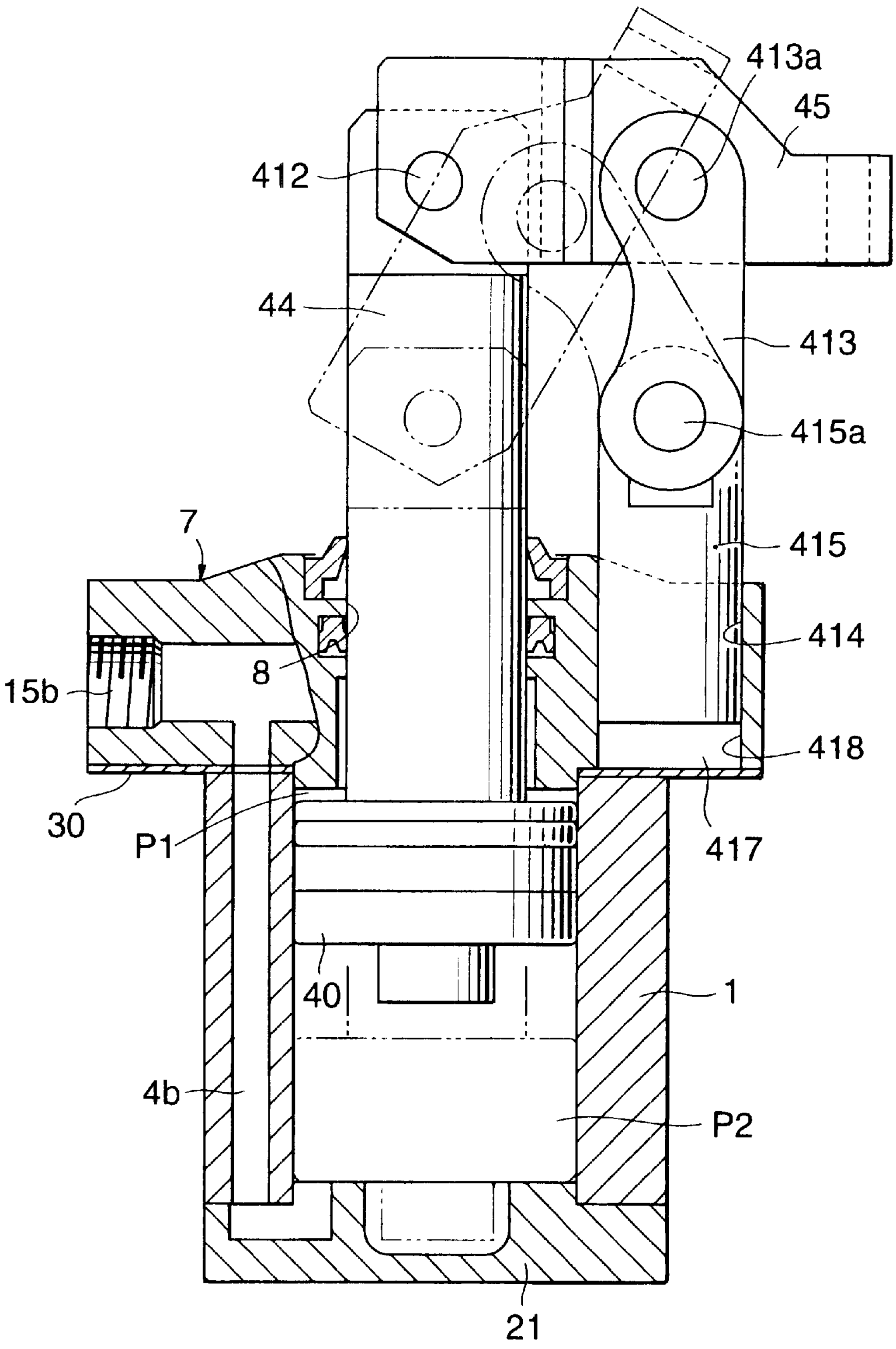
FIG. 14 is a longitudinal sectional view of a clamping cylinder actuator of a linkage type in a fifth embodiment of the present invention.
Figure 15:
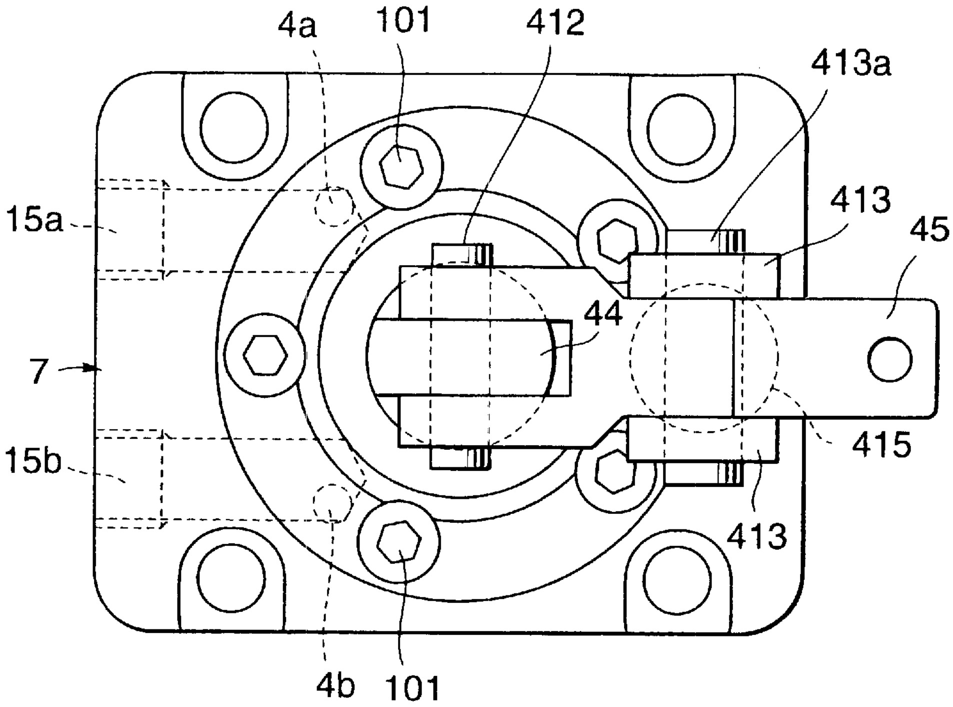
FIG. 15 is a plan view of the clamping cylinder actuator shown in FIG. 14.
Figure 16:
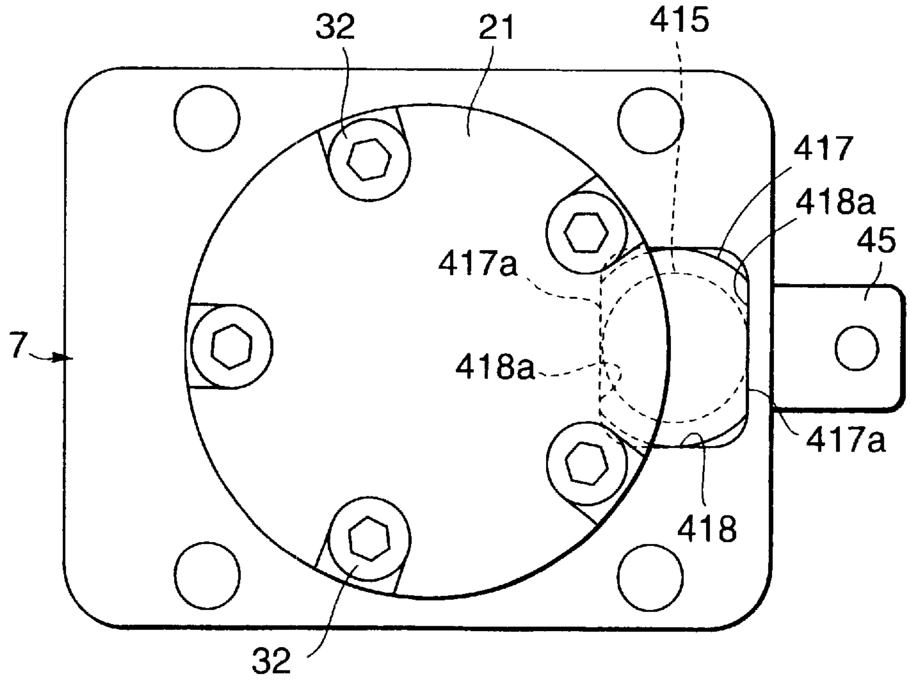
FIG. 16 is a back end view of the clamping cylinder actuator shown in FIG. 14.

Referring to FIGS. 14 to 16 showing a clamping cylinder actuator in the fifth embodiment, a base end portion of a camping member 45 is joined for turning in a vertical plane to an upper end portion of a piston rod 44 with a horizontal pin 412. A front end cover 7 is provided with a vertical through hole 414, a support rod 415 is inserted in the through hole 414 from below the front end cover 7. A link 413 has an upper end portion jointed for turning to a middle portion of the clamping member 45 by a horizontal pin 413*a,* and a lower end portion joined for turning to the upper end of the support rod 415 by a horizontal pin 415*a*. The pins 412, 413*a* and 415*a* are parallel. When the piston rod 44 is moved axially, the base end of the clamping member 45 moves vertically. Consequently, the link 413 turns on the pin 415*a,* and the clamping member 45 is moved between a clamping position on one side of the front end cover 7 and an unclamping position above the front end cover 7 by the combined effect of vertical motions of the piston rod 44 and turning motions of the link 413.

As shown in FIG. 16, the support rod 415 is provided at its lower end with a stopping projection 417. The stopping projection 417 is formed by cutting off diametrically opposite portions of a flange formed by expanding a lower end portion of the support rod 415 in flats 417*a*. A substantially rectangular recess 418 of a shape complementary to that of the stopping projection 417 is formed in a depth equal to the thickness of the stopping projection 417 at the lower end of the through hole 414 in the front end cover 7 in a plane perpendicular to a plane including the respective center axes of the piston rod 44 and the support rod 415. The stopping projection 417 is held between a cylinder 1 and the front end cover 7 with a gasket 30 held between the stopping projection 417 and the cylinder 1. Thus, the support rod 415 is unable to come off the front end cover 7 and is unable to rotate.

Since the link 413 is supported on the support rod 415 held on the front end cover 7, the front end cover 7 can be used also in a clamping cylinder actuator not provided with any member corresponding to the support rod 415 and having a clamping member 45 that is moved only linearly. Since the front end cover 7 and the support rod 415 are separate members, the front end cover 7 and the support rod 415 can be formed of materials suitable for the functions of the same. For example, the front end cover 7 is formed of a material excellent in sliding property, such as a cast metal or a ductile cast iron, and the support rod is formed of a material having a high mechanical strength, such as a carburizing steel or a hardenable steel.

When the support rod 415 is inserted in the through hole 414, and then the front end cover 7 is fastened to the cylinder 1 with the gasket 30 held between the front end cover 7 and the cylinder 1, the stopping projection 417 is held between the cylinder 1 and the front end cover 7. Therefore, the support rod 415 can be simply and firmly held on the front end cover 7 in a correct position without using any fastening members, such as bolts, which is advantageous in reducing part costs.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A clamping cylinder actuator attached to a fixed member to clamp down a workpiece on the fixed member, said clamping cylinder actuator comprising:

a cylindrical member;

a front end cover having an opening and joined to a front end of the cylindrical member;

a piston rod axially slidably extended through the opening of the front end cover;

a back end cover provided at a back end of the cylindrical member; and a gasket held between the cylindrical member and the front end cover to make a sealed joint between the front end of the cylindrical member and a back surface of the front end cover;

wherein the front end cover is attached to a fixed member with a joining surface of the back surface thereof extending outward from a sealing surface of the back surface thereof corresponding to the front end of the cylindrical member in contact with the fixed member, and the gasket covers the sealing surface and the joining surface of the back surface of the front end cover.

2. The clamping cylinder actuator according to claim 1, wherein the cylindrical member includes a cylinder, a back end of which is joined to the back end cover, and the gasket makes a sealed joint between the front end of the cylinder and the back surface of the front end cover.

3. The clamping cylinder actuator according to claim 1, wherein a side port is formed in the front end cover so as to open in a side surface of the front end cover and so as to communicate with a cylinder chamber formed in the cylindrical member, an end port is formed in the front end cover so as to open in the joining surface of the front end cover and so as to communicate with the side port, and a portion of the gasket corresponding to the joining surface serves as a sealing member for sealing the end port.

4. The clamping cylinder actuator according to claim 2, further comprising a gasket held between the cylinder and the back end cover to make a sealed joint between the back end of the cylindrical member and the back end cover.

5. The clamping cylinder actuator according to claim 1, wherein a piston is fitted in a cylinder bore formed in the cylindrical member and is combined with the piston rod, and a pair of side ports are formed in the front end cover so as to open in a side surface of the front end cover and so as to communicate with a front cylinder chamber on the front side of the piston and a back cylinder chamber on the back side of the piston, respectively.

6. The clamping cylinder actuator according to claim 5, wherein a pair of end ports are formed in the front end cover so as to open in the joining surface of the front end cover and so as to communicate with the pair of side ports, a portion of the gasket corresponding to the joining surface serves as a sealing member for sealing the end ports.

7. The clamping cylinder actuator according to claim 1, wherein the cylindrical member includes a cylinder, and a guide member holding member disposed between the cylinder and the front end cover to hold a guide member engaged in a helical guide groove formed in the piston rod, the gasket makes a sealed joint between a front end surface of the guide member holding member and the back surface of the front end cover.

8. The clamping cylinder actuator according to claim 1, wherein the cylindrical member and the back end cover are formed from aluminum shapes, respectively, the cylindrical member has a side wall provided in its outer circumference with a longitudinal sensor holding groove for holding a sensor therein, the back end cover is provided with a sensor inlet groove in a portion thereof corresponding to the sensor holding groove of the cylindrical member, and a bolt hole through which a bolt is passed to fasten the back end cover to the cylindrical member.

9. The clamping cylinder actuator according to claim 8, wherein the cylindrical member has a cylinder bore formed by cold drawing work.

10. The clamping cylinder actuator according to claim 1, wherein a piston is fitted in the cylindrical member, the piston is combined with the piston rod, the piston is axially movable and is restrained from rotation, the piston rod is provided with a helical guide groove in its circumference, a guide member is held on the piston so as to engage the helical guide groove of the piston rod, and the piston rod is axially movable and rotatable relative to the piston.

11. The clamping cylinder actuator according to claim 10, wherein the guide member is a steel ball supported for rolling in a bearing member formed of phosphor bronze, and the bearing member is fitted in a hole formed in the piston.

12. The clamping cylinder actuator according to claim 2, wherein the cylinder has a side wall provided with a plurality of longitudinal through holes for receiving bolts therethrough, either one cover of the front end cover and the back end cover, which are joined to the front end and the back end of the cylinder, respectively, is provided with a plurality of bolt holes, the other cover is provided with a plurality of threaded holes, a plurality of bolts are passed through the bolt holes of the one cover and the longitudinal through holes of the cylinder and are screwed in the threaded holes of the other cover to fasten together the one cover, the cylinder and the other cover.

13. The clamping cylinder actuator according to claim 12, wherein the bolt holes are formed in the back end cover, the threaded holes are formed in the front end cover, and the threaded holes are bottomed ones formed in a predetermined depth from the back surface of the front end cover.

14. The clamping cylinder actuator according to claim 7, wherein the cylinder has a side wall provided with a plurality of longitudinal through holes for receiving bolts therethrough, the guide member holding member is provided with a plurality of bolt holes respectively corresponding to the through holes of the cylinder, the front end cover joined to the front end of the cylinder is provided with a plurality of threaded holes, the back end cover joined to the back end of the cylinder is provided with a plurality of bolt holes, a plurality of bolts are passed through the bolt holes of the back end cover and the through holes of the cylinder and are screwed in the threaded holes of the front end cover to fasten together the back end cover, the cylinder, the guide member holding member and the front end cover.

15. The clamping cylinder actuator according to claim 14, wherein the guide member holding member holding the guide member has a front end portion provided with a recess and a boss extending from the front end portion and fitted in a cylinder bore of the cylinder, the front end cover has a boss fitted in the recess formed in the front end portion of the guide member holding member, and the boss of the guide member holding member has a diameter equal to a diameter of the boss of the front end cover.

16. The clamping cylinder actuator according to claim 1, wherein the front end cover is provided with a side port for supplying a working fluid into and discharging the same from a cylinder chamber defined in the cylindrical member in a side surface thereof, and an end port connected to the side port and opening in the back surface thereof, and one end of a cylindrical member of a different type is covered with the front end cover so that the end port is connected to a fluid passage formed in the cylindrical member of the different type.

17. The clamping cylinder actuator according to claim 1, further comprising a sensor cover capable of covering the cylindrical member in a watertight fashion, wherein a piston associated with the piston rod is fitted in the cylindrical member so as to be axially movable, the cylindrical member having a side wall provided in its outer circumference with a longitudinal sensor holding groove, a sensor for measuring a position of the piston is held in the sensor holding groove so as not to project from the outer circumference of the cylindrical member, the sensor cover including a first covering member fitted on the cylindrical member and a second covering member connected to the first covering member in a watertight fashion, and a cable lead-in device attached to the second covering member to extend a cable through the cable lead-in device into the sensor cover and to connect the same to the sensor.

18. The clamping cylinder actuator according to claim 17, wherein at least a portion of the first covering member corresponding to the outer circumference of the cylindrical member is formed of a transparent material.

19. The clamping cylinder actuator according to claim 1, wherein the front end cover is provided with a longitudinal through hole, a support rod is inserted in the longitudinal through hole of the front end cover, a link has one end pivotally joined to an end portion of the support rod and the other end pivotally joined to a clamper pivotally supported on an free end portion of the piston rod, and the support rod is provided with a stopping projection at its back end to retain the support rod in the longitudinal through hole.

20. The clamping cylinder actuator according to claim 19, wherein the front end cover has a lower portion corresponding to a lower end of the longitudinal through hole and provided with a recess of a shape complementary to that of the stopping projection, the stopping projection of the support rod is fitted in the recess of the lower portion of the front end cover, and the support projection is held between the lower portion of the front end cover provided with the recess and the cylinder.

* * * * *